United States Patent
Van Hooft et al.

(10) Patent No.: US 9,377,146 B2
(45) Date of Patent: Jun. 28, 2016

(54) COUPLING ARRANGEMENT (75) Inventors: Cornelius Antonius Maria Van Hooft, AH Helvoirt (NL); Dirk Jacobus Luyendijk, RE Heeswijk-Dinther (NL); Holger Jongebloed, Schortens (DE)

(73) Assignee: Caterpillar Work Tools B.V., s-Hertogenbosch (NL)

( * ) Notice: Subject to any disclaimer, the term of this patent is extended or adjusted under 35 U.S.C. 154(b) by 625 days.

(21) Appl. No.: 13/821,066

(22) PCT Filed: Sep. 6, 2011

(86) PCT No.: PCT/EP2011/065389
§ 371 (c)(1),
(2), (4) Date: Mar. 6, 2013

(87) PCT Pub. No.: WO2012/032044
PCT Pub. Date: Mar. 15, 2012

(65) Prior Publication Data
US 2013/0199644 A1 Aug. 8, 2013

(30) Foreign Application Priority Data
Sep. 7, 2010 (EP) ..................... 10175660

(51) Int. Cl.
*F16L 37/33* (2006.01)
*E02F 3/36* (2006.01)
*E02F 9/22* (2006.01)
*F16L 37/00* (2006.01)
*F16L 37/62* (2006.01)

(52) U.S. Cl.
CPC ............... *F16L 37/33* (2013.01); *E02F 3/3654* (2013.01); *E02F 3/3663* (2013.01); *E02F 9/2275* (2013.01); *F16L 37/002* (2013.01); *F16L 37/62* (2013.01); *Y10T 137/9029* (2015.04)

(58) Field of Classification Search
CPC ..... E02F 3/3654; E02F 3/3663; E02F 9/2275; F16L 37/002; F16L 37/33; F16L 37/62
USPC .......................................................... 91/432
See application file for complete search history.

(56) References Cited

U.S. PATENT DOCUMENTS

| | | | |
|---|---|---|---|
| 4,371,004 A | 2/1983 | Sysolin et al. | |
| 5,360,313 A | 11/1994 | Gilmore, Jr. et al. | |
| 5,484,250 A | 1/1996 | Gilmore, Jr. et al. | |
| 5,829,337 A | 11/1998 | Barden | |
| 6,301,811 B1 | 10/2001 | Gilmore, Jr. | |
| 6,813,851 B2 | 11/2004 | Mieger et al. | |
| 7,654,787 B2 * | 2/2010 | Sonerud | E02F 3/3654 414/569 |
| 2011/0262212 A1 | 10/2011 | Luyendijk et al. | |

(Continued)

FOREIGN PATENT DOCUMENTS

| | | |
|---|---|---|
| AT | 11312 U1 | 8/2010 |
| CN | 2571834 Y | 9/2003 |

(Continued)

*Primary Examiner* — Michael Leslie (57) ABSTRACT

A coupling arrangement for fluid coupling a worktool to a machine comprising at least one coupler assembly slideably mounted in a cavity for coupling a machine fluid circuit and a work tool fluid circuit, the coupler assembly partitioning the cavity to form a chamber; a diversion path connecting the machine fluid circuit to the chamber; and a check valve positioned in the diversion path for flow of fluid from the machine fluid circuit to the chamber to generate a force on the coupler assembly for maintaining the fluid coupling.

14 Claims, 4 Drawing Sheets

(56) References Cited

U.S. PATENT DOCUMENTS

| | | |
|---|---|---|
| 2013/0177376 A1 | 7/2013 | Van Hooft et al. |
| 2013/0181150 A1 | 7/2013 | Van Hooft et al. |
| 2014/0224115 A1 | 8/2014 | Van Hooft et al. |
| 2014/0300103 A1 | 10/2014 | Frick |

FOREIGN PATENT DOCUMENTS

| | | |
|---|---|---|
| CN | 101492923 A | 7/2009 |
| CN | 201276712 Y | 7/2009 |
| CN | 201406698 Y | 2/2010 |
| CN | 101379248 B | 11/2011 |
| DE | 10159417 | 9/2002 |
| EP | 1127986 | 8/2001 |
| EP | 1388616 | 8/2003 |
| EP | 1473415 | 11/2004 |
| EP | 1566490 | 2/2005 |
| FR | 2886372 | 5/2005 |
| JP | 54098002 | 8/1979 |
| JP | H01143492 | 11/1987 |
| JP | 63041614 | 2/1988 |
| JP | 2002348905 | 12/2002 |
| WO | 0031453 | 6/2000 |
| WO | 2004/072387 A1 | 8/2004 |
| WO | 2004067855 | 8/2004 |
| WO | 2006005949 | 1/2006 |
| WO | 2006043883 | 4/2006 |
| WO | 2009056139 | 5/2009 |
| WO | 2010062166 | 6/2010 |

* cited by examiner

COUPLING ARRANGEMENT

TECHNICAL FIELD

The present disclosure is directed to a coupling arrangement, more particularly to a coupling arrangement for coupling a work tool to a machine.

BACKGROUND

Work tools, such as shears, grabs, or buckets may be coupled with host machines, such as excavators, to perform work operations like cutting, grabbing or excavating. The work tools may be coupled to a boom or stick mechanism of the host machine via a fixed connection or a quick release connection.

A quick release connection allows for a relatively easy exchange of the work tool whereby the operator may connect or change a work tool without leaving the cab. The machine mounting bracket is arranged to slide into the work tool mounting bracket, when the work tool is positioned on the ground. After aligning the mounting bracket of the work tool and the mounting bracket of the machine, a locking device may be moved into a locked position to lock the work tool to the machine.

When connecting the work tool to the machine, the hydraulic hoses of the machine and work tool pressure fluid circuits may be connected for driving the work tool. Automatic hydraulic hose connection systems are known which may be activated by the operator from the cab for connection of the hydraulic hoses. Such systems may often be dependent on the connection of the work tool to the machine. Hydraulic hose couplers may be provided and arranged so that during connection of the work tool to the machine the hose couplers are also automatically connected. When the work tool mounting bracket is connected to the machine mounting bracket, the hose couplers may be contemporaneously connected.

However, aligning the hose couplers may require a higher level of accuracy than alignment of the mounting brackets. In practice, when a coupling arrangement is provided with such hose couplers, an operator may try to avoid relatively rough movements and high forces that are typical when connecting the work tool to the machine. Such actions may result in loss in efficiency. Nevertheless, a relatively high risk to cause damage to the hydraulic hose couplers remains due to the high forces and potential rough alignments between the mounting brackets. When the hose couplers are not aligned accurately, at connection of the machine and work tool pressure fluid circuits, pressurized fluid may escape or the couplers and/or hoses may need to be changed. As the hydraulic circuits of host machines may operate under relatively high pressures, any leakage may cause major spillage of hydraulic fluid and significant downtime.

EP1388616 discloses a coupling arrangement for coupling two ends of a pressurized hydraulic fluid circuit of a work tool and a machine. The coupling arrangement may comprise a quick release mounting bracket for coupling a work tool to a machine. The coupling arrangement may comprise a receiving fluid coupler and a moving fluid coupler, each coupler being connected to a hydraulic hose of a main hydraulic circuit.

One of the couplers may be arranged on the work tool and the other coupler may be arranged on the machine. Both couplers may be connected to each other for providing a fluid passage between the hydraulic hoses so that pressurised fluid may circulate between the fluid circuit of a work tool and a machine. The moving fluid coupler may be moved on a sledge to and from the receiving fluid coupler by an actuator. When the respective moving coupler is coupled to the receiving coupler, a locking notch may engage the moving coupler to keep both couplers coupled so that the actuator may release its pressure while fluid flows through the couplers. The locking notch requires significant space in the coupling arrangement. Moreover, after multiple engagements, the locking notch may become damaged, or may allow for play to occur which may cause leakage of fluid between the couplers. However, without the locking notch, the actuator would have to withstand significant forces that are exerted by the pressurised fluid flowing through the circuit, which may disengage the couplers. Furthermore, during movement of the coupler, the hydraulic hose that is coupled to the moving coupler may become wedged, caught, or trapped in or between the structure of the machine and/or the work tool.

WO2010062166, in the name of Caterpillar Work Tools B.V., discloses a coupling arrangement for coupling a work tool to a machine. The coupling arrangement may have a locking arrangement for locking the work tool to the machine. The locking arrangement may comprise a locking member which may be moved to a locked position where it abuts the locking member receiving elements.

The coupling arrangement further may have at least two fluid couplers arranged to be connected to each other for establishing a fluid passage between a main pressurized fluid circuit channel of a work tool and a main pressurized fluid circuit channel of a machine. The coupling arrangement may further have a driving arrangement for driving at least one of the fluid couplers for connection to the other fluid coupler, the driving arrangement being separate from the main pressurized fluid circuit.

The present disclosure is directed, at least in part, to improving or overcoming one or more aspects of the prior art system.

BRIEF SUMMARY OF THE INVENTION

The present disclosure provides a coupling arrangement for fluid coupling a worktool to a machine comprising at least one coupler assembly slideably mounted in a cavity for coupling a machine fluid circuit and a work tool fluid circuit, the coupler assembly partitioning the cavity to form a chamber; a diversion path connecting the machine fluid circuit to the chamber; and a check valve positioned in the diversion path for flow of fluid from the machine fluid circuit to the chamber to generate a force on the coupler assembly for maintaining the fluid coupling.

Other features and advantages of the present disclosure will be apparent from the following description of various embodiments, when read together with the accompanying drawings.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a coupling arrangement 10 for coupling a machine hydraulic fluid circuit to a work tool hydraulic fluid circuit.

Figure 1:
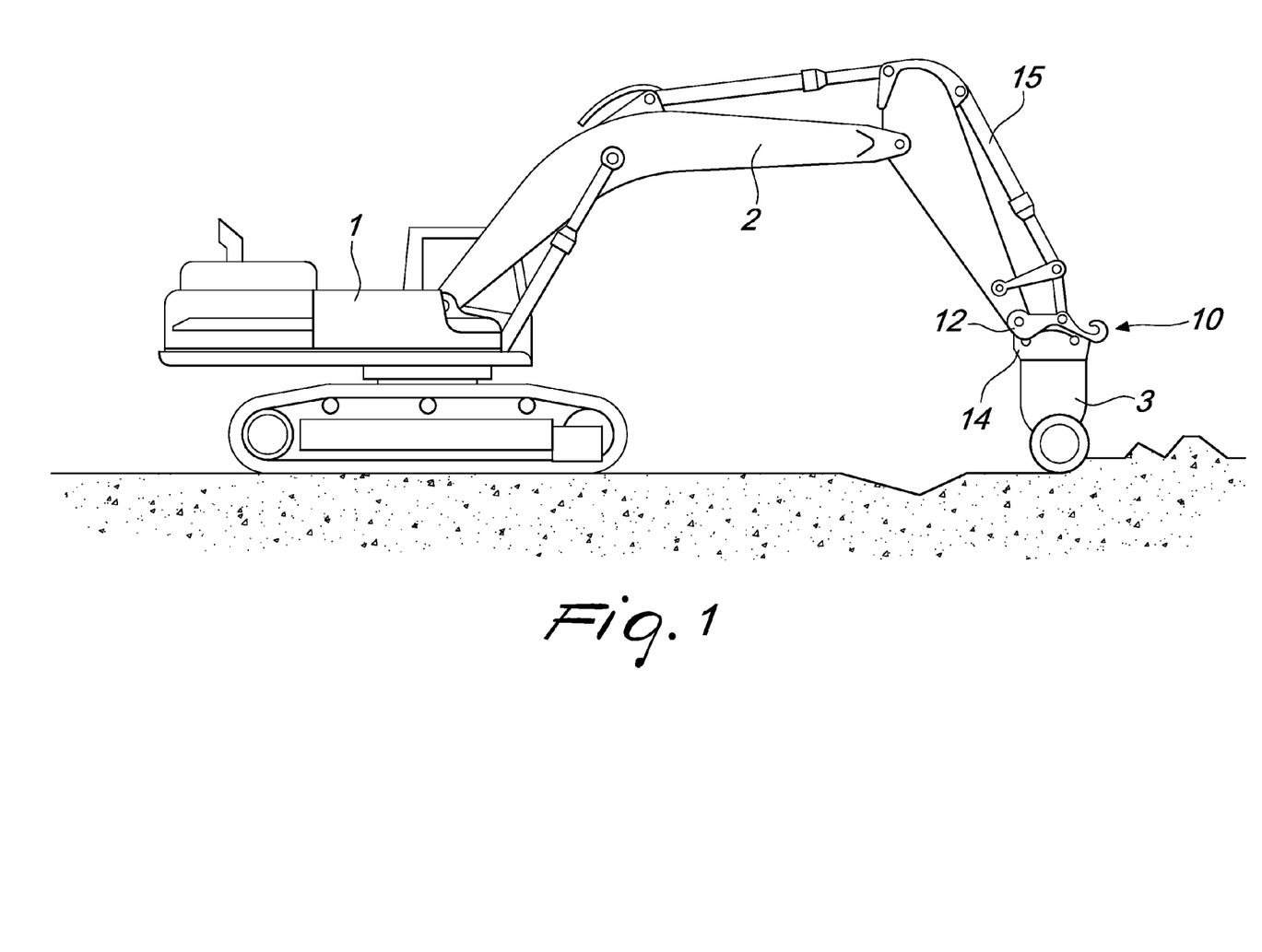
FIG. 1 is a side view of a machine and a work tool provided with a coupling arrangement according to the present disclosure.

FIG. 1 illustrates a host machine 1, as a hydraulic excavator, which may be provided with a hydraulic boom mechanism for driving a boom 2 and a work tool 3. In this description, a boom 2 may be understood as comprising a hydraulic stick mechanism, or similar mechanisms.

Machine 1 may be a mobile machine such as for example an excavator, a back hoe, a digger, a loader, a knuckle boom loader, a harvester or a forest machine.

The work tool 3 may be coupled to the machine 1 through the boom 2. In the embodiment shown, the work tool 3 may comprise a rotary cutter. In other embodiments, work tools 3 may for example include buckets, grapples, hammers and pulverizers.

The work tool 3 may comprise a frame that which carries multiple exchangeable and/or interchangeable tools.

The machine 1 may be provided with a coupling arrangement 10. The coupling arrangement 10 may allow for fluid coupling between a machine bracket 12 and a work tool bracket 14. The machine bracket 12 may be connected to the machine 1. The work tool bracket 14 may be connected to the work tool 3.

A pressurised fluid assembly 15 may extend along the boom 2 for moving the boom 2 and the work tool 3. The pressurised fluid assembly 15 may comprise multiple hydraulic circuits, including a machine fluid circuit and an actuation fluid circuit.

The work tool 3 may comprise a work tool fluid circuit for the hydraulic control thereof. The machine fluid circuit may control fluid flow through the work tool fluid circuit.

The machine fluid circuit may be arranged to drive the boom 2 and to pivot the boom parts with respect to each other. The machine fluid circuit may be arranged to move the work tool 3. For example, the machine fluid circuit may be arranged to pivot and/or rotate the work tool 3 or may be arranged to drive moving parts in the work tool 3, such as rotary parts. The actuation fluid circuit may be arranged to enable fluid coupling between the machine fluid circuit and the work tool fluid circuit.

Figure 2:
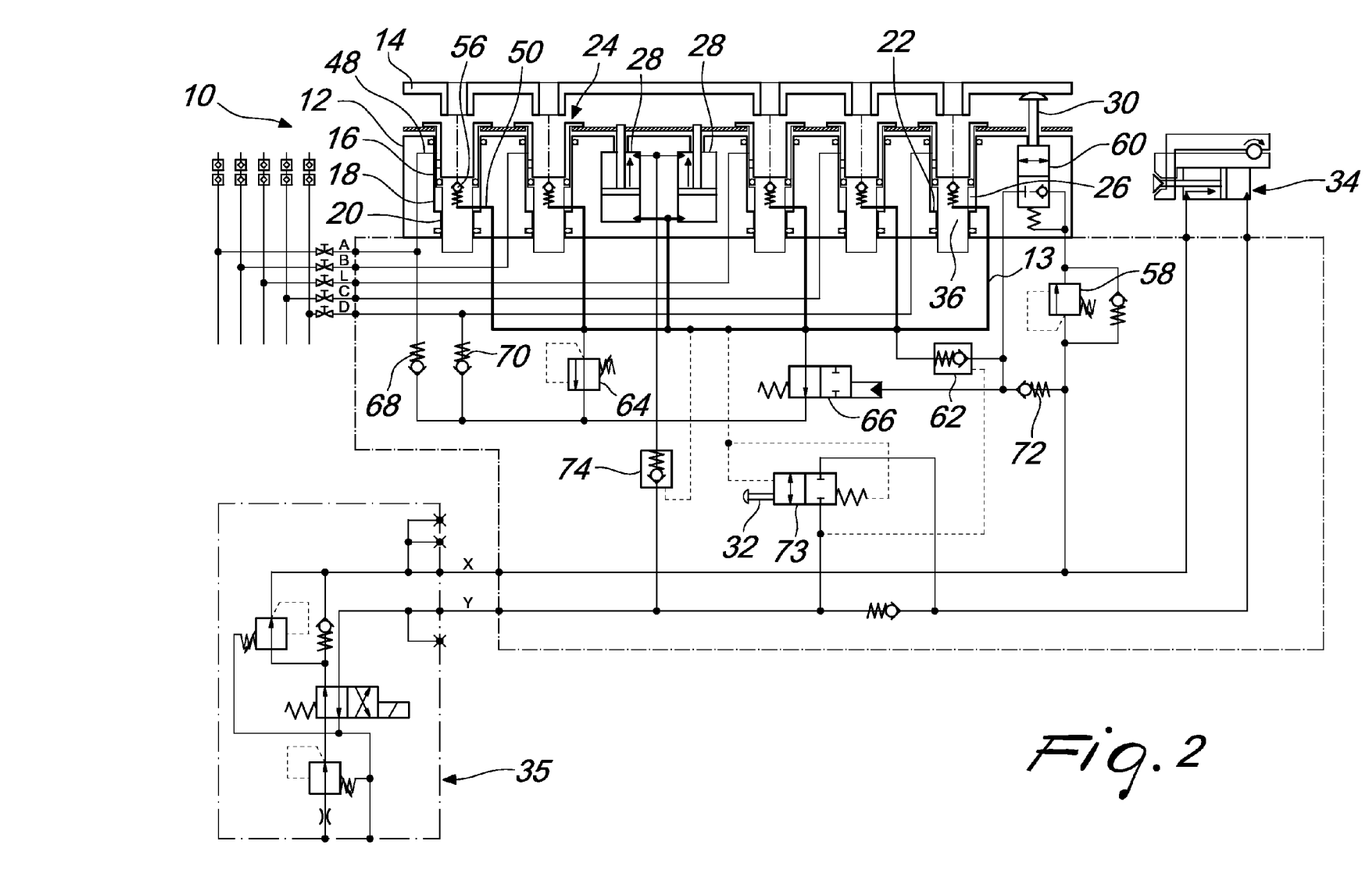
FIG. 2 is a schematic representation of an embodiment of the coupling arrangement according to the present disclosure.

FIG. 2 illustrates an embodiment of a coupling arrangement 10 with hydraulic connections for connecting a machine bracket 12 to a work tool bracket 14 and for forming at least one fluid passage between the machine fluid circuit and the work tool fluid circuit.

The coupling arrangement 10 may comprise the machine bracket 12 which may be provided with at least one cavity 16. The cavity 16 may extend through the machine bracket 12 and may have a cavity wide portion 18 and a cavity narrow portion 20.

Cavity narrow portion 20 may be formed as a plurality of extensions of the wall of cavity 16. In an embodiment, the cavity narrow portion 20 may be a single block extension of the wall of cavity 16. A shoulder 22 may be formed between the cavity wide portion 18 and the cavity narrow portion 20.

The coupling arrangement 10 may comprise a coupler assembly 24 movably mounted in the cavity 16. Both the cavity 16 and the coupler assembly 24 may be correspondingly shaped to allow for the relative movement of the coupler assembly 24. The coupler assembly 24 may be slidably mounted with at least portions thereof being in sliding engagement with the wall of the cavity 16. The coupler assembly 24 may slide between a refracted position, where the coupler assembly 24 retracts fully or partially into the cavity 16, and an extended position, where the coupler assembly 24 protrudes from the machine bracket 12 for engagement with a corresponding fluid coupler in the work tool bracket 14.

The coupling arrangement 10 may comprise a chamber 26 provided in the cavity 16. In an embodiment the chamber 26 may be formed in the cavity wide portion 18 and may be bounded by the wall of the cavity wide portion 18, the shoulder 22 and the coupler assembly 24.

The size of chamber 26 may vary through the movement of the coupler assembly 24 relative to the machine bracket 12. The size of chamber 26 may be made to vary through the inflow and outflow of hydraulic fluid which may move the coupler assembly 24 relative to the machine bracket 12. The changes in the size of the chamber 26 may effect the corresponding retraction and extension of the coupling assembly 24.

In an embodiment the machine bracket 12 may be provided with a series of cavities 16. Each cavity 16 may have a movably mounted coupler assembly 24 and a chamber 26. For fluid coupling the machine bracket 12 to a work tool bracket 14, the work tool bracket 14 may comprise fluid couplers which connect to corresponding coupler assemblies 24 mounted in the machine bracket 12. Fluid coupling the machine bracket 12 to a work tool bracket 14 may be effected with the coupler assemblies 24 in the fully extended positions or the connect position. The coupler assemblies 24 may be in a disconnect position when refracted from the fully extended position.

For operation and control of the coupling arrangement 10 the hydraulic connections may be suitably provided. The machine fluid circuit may comprise hydraulic lines leading to the cavities 16 for connection to respective coupler assemblies 24. In an embodiment, hydraulic lines A, B, C, D and L of the machine fluid circuit may allow flow of hydraulic fluid to and from the work tool fluid circuit when fluid coupling between the brackets 12, 14 are established. Hydraulic fluid may flow through the coupler assemblies 24 in the connect position to and from the corresponding fluid couplers in the work tool bracket 14.

The coupling arrangement 10 may include hydraulic connections to a quick coupler mechanism for locking together brackets 12, 14, such as a quick coupler wedge.

The actuation fluid circuit may be controlled independently from the machine fluid circuit. The actuation fluid circuit includes at least one actuator 28. In an embodiment, the actuator may be a hydraulic cylinder. The actuator 28 may be connected contemporaneously to all the coupler assemblies 24. The actuator 28 may be connected to the coupler assemblies 24 through suitable linkages such as through a connecting rod.

Refraction or extension of the actuator 28 may correspondingly retract or extend the coupler assemblies 24 to a disconnect position or to a connect position respectively. The coupler assemblies 24 may be uniformly retracted or extended by the actuator 28. In an embodiment, a pair of actuators 28 may be provided to ensure an evenly balance load for fluid coupling or decoupling between the coupler assemblies 24 and the corresponding fluid couplers.

The operation of the actuation fluid circuit may be controlled by a bracket switch 30. Bracket switch 30 may control hydraulic fluid flow for the extension of the coupler assemblies 24. Bracket switch 30 may be suitably disposed in order to detect when a work tool bracket 14, having at least one corresponding fluid coupler, is mounted to a machine bracket 12. In an embodiment, the bracket switch 30 may be suitably positioned on the machine bracket 12. The bracket switch 30 may not be activated if the work tool bracket 14 does not carry any corresponding fluid couplers and fluid coupling may not be effected as no flow of hydraulic fluid to extend the coupler assemblies 24 to the connect position is permitted by the bracket switch 30. Bracket switch 30 may prevent actuation of the coupler assemblies 24 when no corresponding fluid couplers are present in the attached work tool bracket 14.

The operation of the machine fluid circuit may be further controlled by a switch 32. Switch 32 may control the flow of hydraulic fluid to a locking device 34 for the unlocking of the brackets 12, 14. Switch 32 may be arranged to be activated only when the actuator 28 is in a fully retracted position. The switch 32 may be arranged not to be activated when the actuator 28 is in an extended position and unlocking of the brackets 12, 14 may not be effected as no flow of hydraulic fluid to actuate the locking device 34 is permitted by the switch 32. Switch 32 prevents premature decoupling between the machine bracket 12 and the work tool bracket 14 when coupler assemblies 24 have not been retracted from the connect position.

In an embodiment the switches 30, 32 may be sensors connected to actuating mechanisms. In an embodiment the switches 30, 32 may be a solenoid or a hydro mechanical device. In an embodiment the switches 30, 32 may be hydromechnical switches which are activated upon physical contact with work tool bracket 14 and the actuator 28.

The coupling arrangement 10 may further comprise a rail circuit 13, denoted by a bold line in FIG. 2, which connects together each chamber 26. The rail circuit 13 may be comprised of a single hydraulic line connected to each of the chambers 26 through further hydraulic lines. The rail circuit 13 may distribute the fluid pressure equally among the chambers 26. Accordingly, the highest pressure in any one chamber 26 may generate the load required to effect the corresponding extension of the coupler assemblies 24 in the other chambers 26. The chamber 26 having the highest working pressure may define the force presented to all coupler assemblies 24.

The rail circuit 13 may be connected to the actuators 28. In an embodiment, the rail circuit 13 may be connected to the piston side of the actuators 28, provided as a hydraulic cylinder.

The coupling arrangement 10 may be connected to a hydraulic power circuit 35 for providing hydraulic pressure to lock and unlock machine bracket 12 to the work tool bracket 14. Unlocking of the brackets 12, 14 by the hydraulic power circuit 35 may be controlled by the switch 32 through hydraulic connections between the hydraulic power circuit 35 and the switch 32.

The hydraulic power circuit 35 may be connected to the actuator 28. In an embodiment, the hydraulic power circuit 35 may be connected to the rod side of the actuator 28, provided as a hydraulic cylinder.

The hydraulic power circuit 35 may be arranged to provide pressurised fluid to the rail circuit 13. The bracket switch 30 may be disposed in the connection between the hydraulic power circuit 35 and the rail circuit 13.

Figure 3:
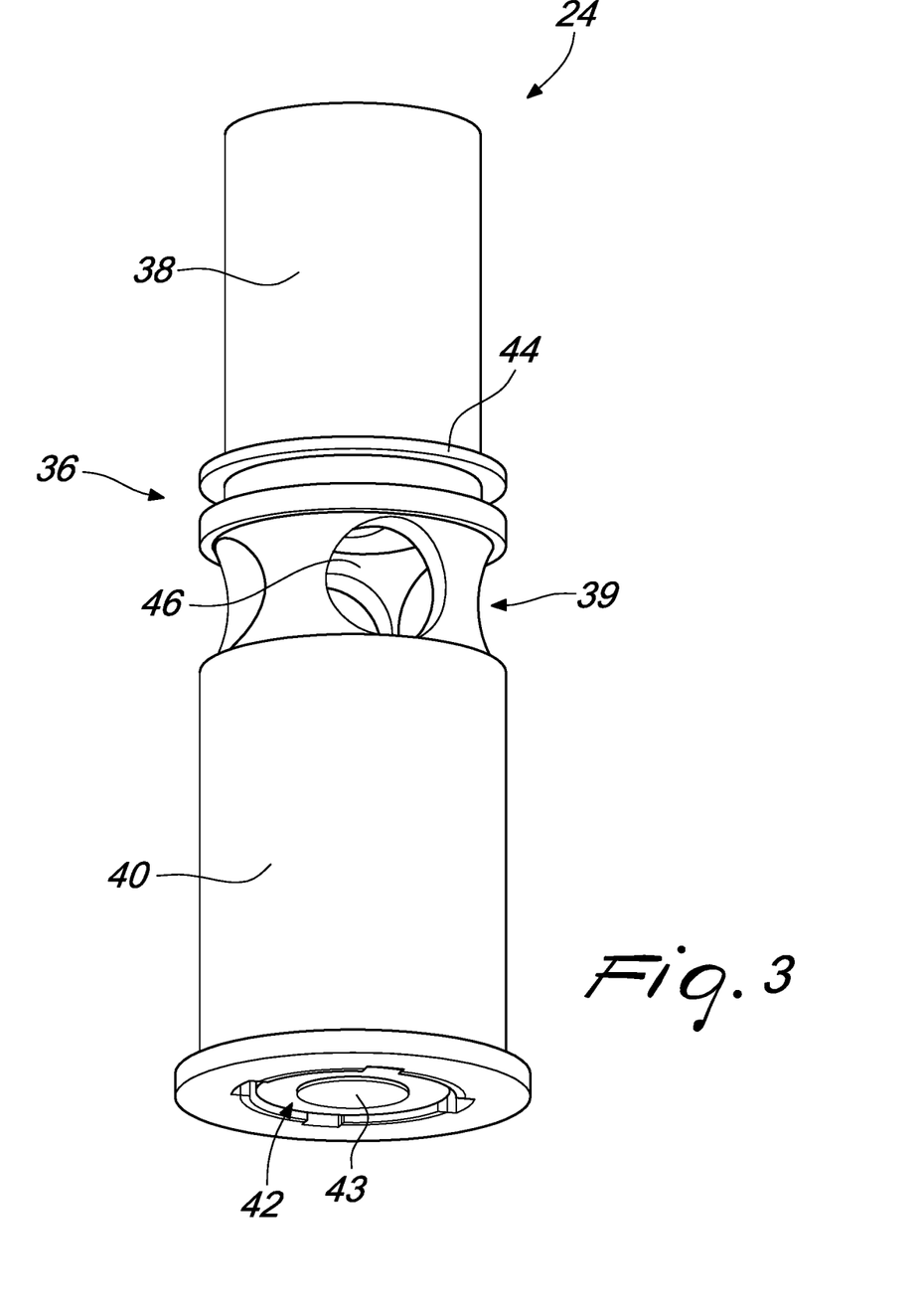
FIG. 3 is an isometric view of an embodiment of a coupling assembly according to the present disclosure.

FIG. 3 illustrates a coupler assembly 24. The coupler assembly 24 may comprise a hollow plunger 36. Plunger 36 may have a suitable form and dimensions to be slidingly mounted within the cavity 16. Plunger 36 may have a plunger narrow portion 38, a gate portion 39 and a plunger wide portion 40. In an embodiment, the gate portion 39 may be positioned within the plunger wide portion 40 and adjacent to the plunger narrow portion 38. The gate portion 39 may be recessed from the plunger wide portion 40.

The plunger narrow portion 38 may be in sliding engagement with the cavity narrow portion 20. The plunger narrow portion 38 may be arranged to sealingly engage with cavity narrow portion 20 to restrict leakage of hydraulic fluid between the plunger narrow portion 38 and the cavity narrow portion 20.

The plunger wide portion 40 may be in sliding engagement with the cavity wide portion 18. The plunger wide portion 40 may be arranged to sealingly engage with cavity wide portion 18 to restrict leakage of hydraulic fluid between the plunger wide portion 40 and the cavity wide portion 18.

The gate portion 39 may not be in contact with wall of the cavity wide portion 18.

A fluid coupler 42 may be positioned within the plunger 36. Plunger 36 may be provided with retaining structures to hold the fluid coupler 42 within the walls thereof. Fluid coupler 42 may have a through fluid channel 43 along the longitudinal axis of the plunger 36. The fluid channel 43 may communicate with the hollow of the plunger 36.

The fluid coupler 42 may couple with the corresponding fluid coupler, having a fluid channel disposed therein, in the work tool bracket 14. Respective fluid channels form a fluid passage when the fluid couplers are connected. At fluid coupling hydraulic fluid from the machine fluid circuit may flow through the fluid channels to the work tool fluid circuit. Fluid coupler 42 may be formed as a male or female element for coupling to the fluid coupler with the corresponding form.

Extending laterally from the plunger 36 may be a pressure element 44. In an embodiment the pressure element 44 may encircle the plunger 36 and may be formed as a rib or a protrusion. In an embodiment the pressure element 44 may extend from and encircle the plunger wide portion 40. With the coupler assembly 24 mounted in the cavity 16, the pressure element 44 may extend from the plunger 36 through the cavity 16 to slidingly engage the wall of the cavity wide portion 18. The pressure element 44 may separate the chamber 26 from rest of the cavity wide portion 18.

The pressure element 44 may be arranged to sealingly engage with the wall of the cavity wide portion 18 to limit leakage of hydraulic fluid between the wall of the cavity wide portion 18 and the pressure element 44. The pressure element 44 may be suitably shaped or may be provided with a gasket to slidingly and sealingly engage cavity wide portion 18.

The pressure element 44 may have a pressure surface 45 which, in an embodiment, may face the shoulder 22. The dimensions and/or shape of the pressure surface 45 may be a function of the diameter of the coupler assembly 24, the diameter of the fluid coupler 42, the diameter of the corresponding fluid coupler in the work tool bracket 14 and/or the difference in the diameters of the fluid coupler 42 and the corresponding fluid coupler. The dimensions and/or shape of the pressure surface 45 may depend on the fluid dynamics of the fluid coupler 42 and the corresponding fluid coupler. Fluid dynamics may be dependent on the structure of fluid couplers, the type of hydraulic fluid and/or the fluid pressure used for the fluid coupling.

At least one bore 46 may be provided in the plunger 36 which may allow flow of hydraulic fluid from the exterior of the plunger 36 into the hollow thereof. The fluid channel 43 of the fluid coupler 42 may communicate through the hollow of the plunger 36 with the bore 46. The bore 46 may be provided in the gate portion 39. In an embodiment, the gate portion 39 may be provided with a plurality of bores 46. Hydraulic fluid may flow around the gate portion 39 guided by walls formed by the plunger wide portion 40 and into the hollow through the plurality of bores 46.

In an embodiment, a single bore 46 may be provided in the plunger 36, not provided with a gate portion 39. The bore 46 may be positioned between the pressure element 44 and the plunger wide portion 40.

The size and the number of the bores 46 may be a function of the diameter of the coupler assembly 24, the diameter of the fluid coupler 42, the diameter of the corresponding fluid coupler in the work tool bracket and/or the difference in the diameters of the fluid coupler 42 and the corresponding fluid coupler. The dimensions and/or shape of the bore 46 may be dependent on the dimension and/or shape of the pressure surface 45. The dimensions and/or shape of the bore 46 may depend on the fluid dynamics of the fluid coupler 42 and the corresponding fluid coupler.

Figure 4:
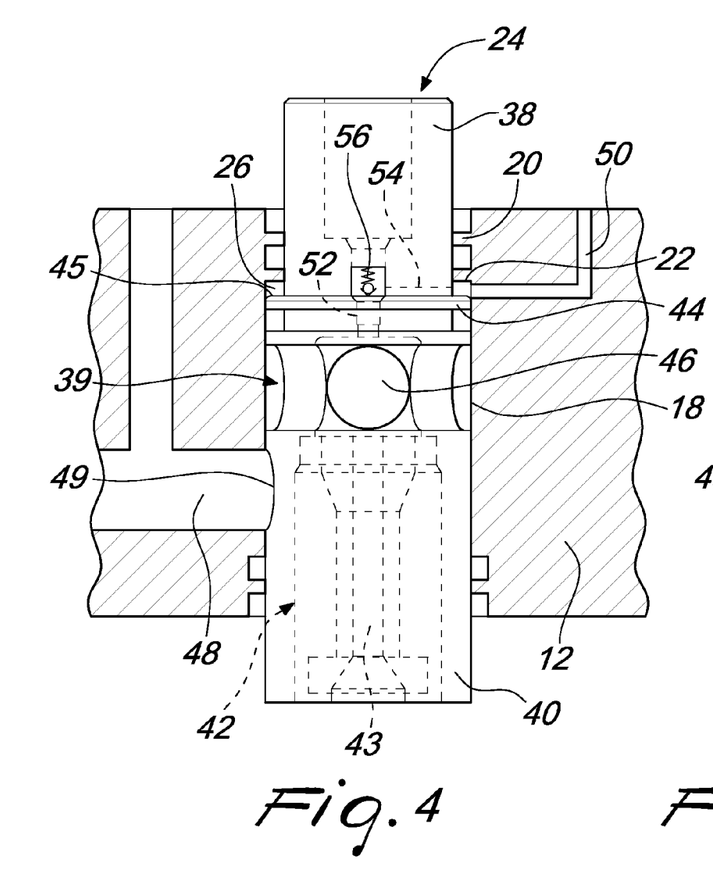
FIG. 4 is a cross sectional view of a mounted coupling assembly of FIG. 2 in a retracted position according to the present disclosure.
Figure 5:
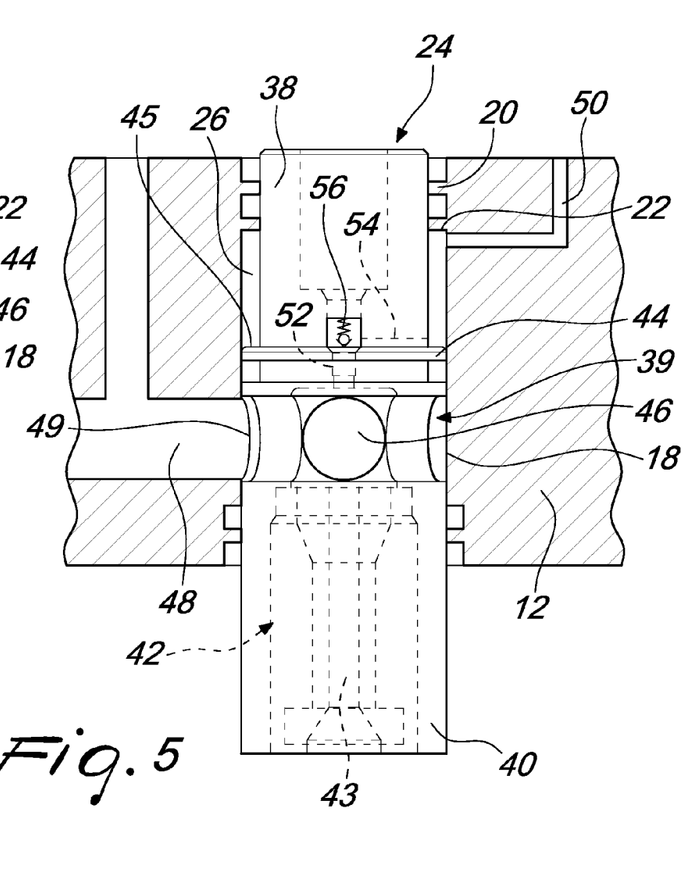
FIG. 5 is a cross sectional view of a mounted coupling assembly of FIG. 2 in an extended position according to the present disclosure.

FIGS. 4 and 5 illustrate a coupler assembly 24 slidingly mounted in the machine bracket 12. In FIG. 4 the coupler assembly 24 may be retracted to the disconnect position and in FIG. 5 the coupler assembly 24 may be extracted to the connect position. The retraction of the coupler assembly 24 within the cavity 16 may be limited by the shoulder 22 which may abut pressure surface 45.

Machine bracket 12 may have a machine circuit line 48, which forms part of the machine fluid circuit, leading to the cavity 16. Fluid from the machine fluid circuit may flow through the machine circuit line 48 to the cavity 16 through a port 49. In the machine bracket 12 having plurality of cavities 16, each cavity 16 may be separately connected to the machine fluid circuit through a plurality of corresponding circuit lines 48. In an embodiment, hydraulic lines A, B, C, D and L may allow flow of hydraulic fluid to and from the ports 49 through respective machine circuit lines 48.

Machine bracket 12 may have a rail circuit line 50, which forms part of the rail fluid circuit, leading to the cavity 16. In an embodiment the rail circuit line 50 leads to the chamber 26. Fluid from the rail fluid circuit may flow through the rail circuit line 50 to the chamber 26.

The chamber 26 in the cavity wide portion 18 may be bounded by the wall of the cavity wide portion 18, the shoulder 22, the pressure surface 45 and the plunger narrow portion 38. The size of chamber 26 may depend on the inflow and outflow of hydraulic fluid through the rail circuit line 50. Inflow of fluid into the chamber 26 may result in an increase in fluid pressure therein, as the chamber 26 may be fluid tight. The fluid pressure may act on the surfaces which bound the chamber 26. The increasing fluid pressure acting on the pressure surface 45 may effect extraction of the coupler assembly 24 slidingly mounted in the machine bracket 12. The coupler assembly 24 may be extracted to the connect position through continued inflow of hydraulic fluid under pressure to establish fluid coupling between the fluid coupler 42 and the corresponding fluid coupler in the work tool bracket 14.

A diversion passage 52 may extend axially within the plunger 36 from the gate portion 39 toward the pressure element 44. The diversion passage 52 may be axially aligned with the longitudinal axis of the plunger 36. In an embodiment the diversion passage 52 may extend beyond the pressure element 44. Hydraulic fluid flowing through the bores 46 may flow into the hollow of the plunger 36 and to the diversion passage 52.

The dimensions and/or shape of the diversion passage 52 may be a function of the diameter of the coupler assembly 24, the diameter of the fluid coupler 42, the diameter of the corresponding fluid coupler in the work tool bracket and/or the difference in the diameters of the fluid coupler 42 and the corresponding fluid coupler. The dimensions and/or shape of the diversion passage 52 may be dependent on the dimension and/or shape of the bore 46. The dimensions and/or shape of the diversion passage 52 may be dependent on the dimension and/or shape of the pressure surface 45. The dimensions and/or shape of the diversion passage 52 may depend on the fluid dynamics of the fluid coupler 42 and the corresponding fluid coupler.

Extending from the diversion passage 52 may be a diversion line 54. The diversion line connects the diversion passage 52 to the chamber 26. In an embodiment the diversion line 54 may extend laterally from the diversion passage 52 to the chamber 26. In an embodiment, the diversion line 54 may be disposed such that the pressure surface 45 is positioned between the bores 46 and the diversion line 54. In an embodiment the diversion passage is a hose mounted externally to the plunger 36. In an embodiment, the diversion line 54 may have a smaller diameter than diversion passage 52 such that the fluid pressure increases as the hydraulic fluid enters the diversion line 54. Hydraulic fluid flowing into the bore 46 may flow through the diversion passage 52 and the diversion line into the chamber 26.

A check valve 56 may be provided at the junction of the diversion passage 52 and the diversion line 52. The check valve 56 may permit flow of fluid from the diversion passage 52 to diversion lines 54 and prevent flow of fluid from the diversion line 54 to diversion passage 52. In an embodiment, check valve 56 may be disposed such that the pressure surface 45 is positioned between the bore 46 and the check valve 56.

With reference to FIG. 4 the coupler assembly 24 is retracted and may be disconnected from the corresponding fluid coupler. The gate portion 39 may be recessed into the cavity wide portion 18. The gate portion 39 may be sealed from fluid entry by the cavity wide portion 18. Port 49 of the machine circuit line 48 may be sealed by the plunger wide portion 40.

In an embodiment, bore 46, in the plunger 36 not provided with a gate portion 39, may be recessed into the cavity wide portion 18 and may be sealed from fluid entry by the cavity wide portion 18.

With reference to FIG. 5 the coupler assembly 24 is extended and may be connected to the corresponding fluid coupler. The gate portion 39 may be positioned to be in fluid communication with the port 49 of the machine circuit line 48. Fluid may flow from the machine circuit line 48 through port 49 and into the gate portion 39. Hydraulic fluid may flow around the gate portion 39 and into the hollow of plunger 36 through the plurality of bores 46.

In an embodiment, when the gate portion 39 is in fluid communication with machine circuit line 48 the coupler assembly 24 may be at a fully extended position. In an embodiment, the gate portion 39 may have dimension and/or shape which corresponds to the port 49.

In an embodiment with plunger 36 not provided with a gate portion 39, when the coupler assembly 24 is extended the bore 46 may be positioned to be in fluid communication with the port 49 of the machine circuit line 48. Fluid may flow from the machine circuit line 48 through port 49 and into the bore 46. Hydraulic fluid may flow into the hollow of plunger 36 through the bore 46.

In an embodiment, the bore 46 may have dimension and/or shape which corresponds to the port 49. In an embodiment, when the bore 46 is in fluid communication with machine circuit line 48 the coupler assembly 24 may be at a fully extended position.

With reference to FIG. 2, the operation of the coupling arrangement 10 may be initiated by coupling a machine bracket 12 to a work tool bracket 14. The hydraulic power circuit 35 may be activated to actuate the locking device 34 to lock machine bracket 12 to the work tool bracket 14. The locking device 34 may be actuated to lock the brackets 12, 14 through increased fluid pressure through line X. In an embodiment, the increased fluid pressure may act on the rod side of the locking device 34.

Upon locking of the brackets 12, 14, pressure in the hydraulic lines may increase further. A pressure regulator 58 may be connected to line X. Pressure regulator 58 may open only when the locking pressure in the locking device 34 is higher than a preset value. In an embodiment, the value is selected from the range of 60 bar-90 bar. In an embodiment, the value is 70 bar. Flow of hydraulic fluid to the bracket switch 30 and the rail circuit 13 may be prevented before the brackets 12, 14 are mechanically locked.

Hydraulic fluid may flow to the bracket switch 30 when the pressure regulator 58 opens to permit fluid flow. Bracket switch 30 may be activated if the work tool bracket 14, carrying a corresponding fluid coupler, is coupled to the machine bracket 12. Activation of the bracket switch 30 may effect the actuation of a valve 60 to permit flow of fluid to check valve 62.

Check valve 62 may permit fluid to flow into the rail circuit 13 and through rail circuit lines 50 to the chambers 26. Increased flow of fluid in the chambers 26 results in increased fluid pressure therein. The fluid pressure may act on the pressure surfaces 45 of the coupler assemblies 24 effecting extension from the disconnect position to an extended position at which a fluid coupling between the fluid couplers 42 and the corresponding fluid couplers in the work tool bracket 14 is established. The build up of pressure in chamber 26 may not enter the hollow of plunger 36 as a result of the check valve 56 which blocks the flow of fluid from the diversion line 54 to the diversion passage 52.

In an embodiment, check valve 62 may permit fluid to flow through the rail circuit 13 to the piston side of the actuators 28. Increased flow of fluid into the piston side chambers of the actuators 28 may result in increased fluid pressure therein to effect extension of the actuators 28. The actuators 28 may be connected to the coupler assemblies 24 and may effect a corresponding extension of the coupler assemblies 24. The extension of the coupler assemblies 24 through extension of the actuators 28 may be optional or may be in addition to the extension effected by the action of the pressurised fluid on the pressure surface 45.

Extraction of the coupler assemblies 24 through the pressure build up in the chambers 26 and/or extension of the actuators 28, may connect lines A, B, C, D and L through respective lines 48 and ports 49 to the hollows of plungers 36 to allow fluid flow from the machine fluid circuit into the hollow of plunger 36. If the machine fluid circuit is not actuated, fluid inside the hollow of plunger 36 may remain at atmospheric or tank pressure. Upon actuation of the machine fluid circuit the pressure in the lines 48 and the hollow of plunger 36 may increase.

At fluid coupling between the fluid couplers 42 and the corresponding fluid couplers, the gate portions 39 may be in fluid communication with ports 49 allowing fluid to flow through machine circuit lines 48 into the hollow of plunger 36. Fluid may then pass through fluid channels 43 in the fluid couplers 42 to the respective channels in the corresponding fluid couplers.

In an embodiment, at fluid coupling between the fluid couplers 42 and the corresponding fluid couplers, the bores 46 of each plunger 36 may be in fluid communication with ports 49 allowing fluid to flow through machine circuit lines 48 into the hollow of plunger 36. Fluid may then pass through fluid channels 43 in the fluid couplers 42 to the respective channels in the corresponding fluid couplers.

At fluid coupling between the fluid couplers 42 and the corresponding fluid couplers and flow of pressurised fluid through the respective fluid channels, separation forces may be generated which act on the fluid couplers. The separation forces may be countered by the fluid pressure acting on the pressure surface 45 and/or the actuators 28. In an embodiment, pressure in the chamber 26 may be sufficient to generate a force on the pressure surface 45 to maintain fluid coupling between the fluid couplers. In an embodiment, fluid coupling between the fluid couplers may be maintained through the pressure in the actuators 28 and the pressure in the chamber 26 acting on the pressure surface 45.

The separation forces generated may be dependent on the pressure of the fluid in the machine circuit. In an embodiment, an increase in the machine fluid circuit pressure may result in a higher separation force between the fluid couplers. The pressure surface 45 may be provided such that the difference in the ratio between the fluid coupler surfaces and pressure surface 45 is greater than 1 so that force acting on pressure surface 45 is greater than the separation force.

The chamber 26 may be connected to the machine fluid circuit via the check valve 56 mounted in the plunger 36. If pressure in the machine fluid circuit is higher than the pressure in the chamber 26, the fluid in the hollow of the plunger 36 may be at a higher pressure value and may flow to the chamber 26 where the fluid pressure has a lower pressure value. The fluid at a higher pressure will flow from the hollow of the plunger 36 through the diversion passage 52, the check valve 56 and the diversion line 54 into the chamber 26. The flow of fluid may continue till the pressure in the chamber 36 and pressure in the hollow of the plunger 36 equalise.

As the pressure in the chamber 26 generates a force on the pressure surface 45, the force acting on the pressure surface 45 may be equal to the separation forces generated by the fluid flowing from the hollow of plunger 36 through the fluid channels and which act on the fluid couplers. The equalising of pressures in the chamber 26 and the hollow of plunger 36 may serve to lock the coupler assemblies 24. As all chambers 26 are connected through the rail circuit 13, a higher pressure load in one chamber 26 may be distributed to the other chambers 26, even if the pressures in the hollow of the respective plungers 36 may be at a lower pressure value.

As fluid may not flow from the chamber 26 to the hollow of plunger 36, due to the check valve 56, the pressure in the chamber 26 may remain even when the pressure in the machine fluid circuit drops to a pressure value lower than the pressure value in the chamber 26. The pressure level may be available in the chambers 26 independent of the pressure in the hydraulic lines A, B, C, D and L of the machine circuit. As all chambers 26 are connected through the rail circuit 13, a balanced pressure load may be present to all coupler assemblies 24, even if the machine circuit pressure is lower or absent.

In an embodiment, check vale 62 may be pilot operated to block inflow of fluid having potentially damaging fluid pressures so as to avoid damage to components that may not be designed to withstand a high pressure. The check valve 62 may block high pressure in the rail circuit 13 from reaching the locking device 34.

In an embodiment, a pressure relief valve 64 may connect the rail circuit 13 to machine fluid circuit. The pressure relief valve 64 may be an adjustable pilot operated valve that is mounted to remove excessive pressure peaks generated in the machine fluid circuit that may be transmitted to the chambers 26 through the check valve 56 and the rail circuit 13. The pressure relief valve 64 may have pressure setting that is significantly higher than the maximum pressure tolerable in the chambers 26 and the rail circuit 13 to avoid unintended loss of force needed to maintain fluid coupling. In an embodiment, the pressure relief valve 64 may have pressure setting selected from the range of 390 bar-420 bar. In an embodiment, the pressure setting is 420 bar.

With reference to FIG. 2, operation of the coupling arrangement 10 to decouple machine bracket 12 from the work tool bracket 14 may be initiated by relieving pressure in the chambers 26 and the rail circuit line 50 through the rail circuit 13.

In an embodiment, a primary drain circuit for the rail circuit 13 may be provided through a normally-open drainage switch 66 and primary drainage check valves 68, 70. Drainage switch 66 may close to block the drain function, only when the chambers 26 and the rail circuit line 50 are pressurised.

Primary drainage check valves 68, 70 may be connected to the machine fluid circuit. In an embodiment primary drainage check valves 68, 70 may be connected to lines A and B, wherein either one of these lines may be depressurized to allow return fluid to flow back to the tank. The return fluid may consist of a fluid volume in the piston side of the actuators 28 and in the chambers 26.

In an embodiment, further primary drainage check valves may be provided which are connected to the other hydraulic lines.

Pressure in line X may relieved while line Y may be pressurised though the hydraulic power circuit 35. Fluid from line Y may flow into the rod side of the actuators 28. Increase in pressure in the rod side and the reduction of pressure in the piston side may effect a retraction of the actuators 28. As the actuators 28 are connected to the coupler assemblies 24, the coupler assemblies 24 may be correspondingly retracted and disconnected from fluid coupling. The full retraction of the actuators 28 may correspondingly effect complete retraction of the coupler assemblies 24 into the machine bracket 12.

A secondary drain circuit may consist of check valve 62 and secondary drainage check valve 72. The valves 62 and 72 may allow fluid to flow back to the tank through line X but only if line Y is pressurised. The return fluid may consist of a fluid volume in the piston side of the actuators 28 and in the chambers 26.

Switch 32 may detect the position of the actuators 28. Switch 32 may be normally closed and may block flow of fluid from the hydraulic power circuit 35 through line Y to locking device 34. At complete retraction of the actuators 28 the switch 32 may effect the actuation of the valve 73 to permit flow of fluid from the hydraulic power circuit 35 to the piston side of the locking device 34 to unlock the brackets 12, 14. This is a safety measure to avoid unintended operation of the locking device 34 if the coupler assemblies have not been retracted completely into the machine bracket 12.

A relief valve 74 may be provided in the hydraulic line connecting line Y and the rod sides of the actuators 28 to avoid any unintended drift of the actuators 28 in the disconnected position. The relief valve 74 may be pilot operated. The fluid in the rod side of the actuators 28 may be trapped unless chambers 26 and the lines 50 are pressurized to such level as to pressure regulator 58.

The skilled person would appreciate that foregoing embodiments may be modified to obtain the apparatus of the present disclosure.

INDUSTRIAL APPLICABILITY

This disclosure describes a coupling arrangement 10 for coupling a machine hydraulic fluid circuit to a work tool hydraulic fluid circuit. In a machine 1, work tools 3 may be used for handling heavy materials. Work tools 3 may demolish, drill, dig, plow, cut, grab and/or carry heavy materials which may include sand, stone, metal, and more. Work tools 3 may be coupled to and powered by machines 1, in particular mobile host machines. The machine 1 may be provided with transmissions, hydraulic equipment, booms 2 and/or sticks for driving the work tool 3. Work tool operations may be controlled by the operator via an operating panel in the cab of the machine 1.

The coupling arrangement 10 may have at least one hollow plunger 36 provided with a check valve 56. The hollow plunger 36 may connect the machine fluid circuit to the rail fluid circuit through diversion passage 52 and diversion line 54. The fluid pressure in the machine fluid circuit may be used to retain the fluid coupling of the fluid couplers. The check valve 56 may restrict the fluid flow from the rail fluid circuit to the machine fluid circuit.

In operation of the coupling arrangement 10, pressure in the chambers 26 may be provided from either the rail fluid circuit, during the connection process, or the machine fluid circuit, during operation of the work tool. Check valves 56 and 62 may allow pressure to build up in the chambers 26. The prevailing pressure value in the chambers 26 may be the higher of the pressure values of the machine fluid circuit or the rail fluid circuit. This pressure in the chambers 26 may remain even if the pressure source is no longer available. Pressure relief valve 64 may protect the chambers 26, the rail circuit line 50 and the rail circuit 13 against damage as a result of excessive pressure.

The coupling arrangement 10 may have at least one hollow plunger 36 provided with a gate portion 39 having a plurality of bores 46 or a bore 46. When the coupler assemblies 24 are retracted to a disconnect position, the chambers 26 may be sealed from the hydraulic lines of the machine fluid circuit. At disconnection, the coupler assembly 24 may not be actuated unintentionally as a result of pressure build up in the hydraulic lines of the machine fluid circuit when fluid coupling has not yet been established.

The coupling arrangement 10 may have a rail fluid circuit to ensure a balanced load on the coupler assemblies 24. All chambers 26 may be connected through the rail fluid circuit to allow the highest pressure in any of the hydraulic lines of the machine fluid circuit or of the rail fluid circuit to generate the load required to retain fluid coupling between the fluid couplers.

The coupling arrangement 10 may have a bracket switch 30 to detect whether the work tool bracket 14 carries a corresponding fluid coupler. Bracket switch 30 may not permit fluid pressurisation of the rail fluid circuit when a work tool bracket 14 carrying a corresponding fluid coupler is not detected. The bracket switch 30 may avoid inefficient coupling present in devices wherein fluid connections are established simultaneously at mechanical coupling of the machine bracket and the work tool bracket.

The coupling arrangement 10 may have a switch 32 to detect whether the actuators 28 are fully retracted. The activation of switch 32 determines whether the locking device 34 may be actuated to unlock the brackets 12, 14 without the risk of potential damage to the fluid couplers and/or couplers assemblies 24.

The industrial applicability of the coupling arrangement 10 as described herein will have been readily appreciated from the foregoing discussion.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A coupling arrangement for fluid coupling a work tool to a machine comprising:
    at least one coupler assembly slideably mounted in a cavity for coupling a machine fluid circuit and a work tool fluid circuit, the coupler assembly partitioning the cavity to form a chamber;
    a diversion path connecting the machine fluid circuit to the chamber; and
    a check valve positioned in the diversion path for flow of fluid from the machine fluid circuit to the chamber to generate a force on the coupler assembly for maintaining the coupling;
    wherein the at least one coupler assembly comprises a plunger and the diversion path is positioned within the plunger.

2. A coupling arrangement according to claim 1 wherein the at least one coupler assembly comprises a pressure element slideably engaged to the cavity and to seal the chamber.

3. A coupling arrangement according to claim 2 wherein the fluid in the chamber exerts the force on the pressure element.

4. A coupling arrangement according to claim 2 wherein the check valve and the diversion path are disposed in the coupler assembly.

5. A coupling arrangement according to claim 4 further comprising at least one actuator connected to the coupler assembly for movement between a connect position and a disconnect position.

6. A coupling arrangement according to claim 5 comprising a plurality of coupler assemblies slideably mounted in corresponding cavities and forming a plurality of chambers.

7. A coupling arrangement according to claim 6 wherein the plurality of chambers are mutually connected through a rail circuit.

8. A coupling arrangement according to claim 7 wherein the rail circuit is arranged to move the coupler assemblies from a disconnect position to a connect position.

9. A coupling arrangement according to claim 6, 7 or 8 further comprising a plurality of check valves.

10. A coupling arrangement according to claim 9 further comprising an opening in the coupler assembly for flow of fluid from the machine fluid circuit to the work tool fluid circuit.

11. A coupling arrangement according to claim 10 wherein the opening communicates with the machine fluid circuit when the machine fluid circuit and the work tool fluid circuit are coupled.

12. A coupling arrangement according to claim 11 wherein the opening is retracted from communication with the machine fluid circuit at decoupling of the machine fluid circuit and the work tool fluid circuit.

13. A coupling arrangement according to claim 12 wherein the opening is a gate portion.

14. A coupling arrangement according to claim 12 wherein the opening is a bore.

* * * * *